Patented Sept. 2, 1952

2,609,364

UNITED STATES PATENT OFFICE 2,609,364

PRODUCTION OF FORM-STABLE, RUBBER-LIKE POLYVINYL N-BUTYL ETHERS

Abraham O. Zoss, Easton, Pa., assignor to General Aniline & Film Corporation, New York, N. Y., a corporation of Delaware No Drawing. Application April 11, 1945, Serial No. 587,838

6 Claims. (Cl. 260—88.1)

The present invention relates to rubberlike high molecular polymers from vinyl n-butyl ether and to a process of preparing the same.

Considerable work has been done in the past in the polymerization of vinyl-n-butyl ether. Such prior work is illustrated by USP 2,098,108 and 2,104,000, Chalmers, Canadian Journal of Research, volume 7, pages 472–480 (1932) and Shostakovskii and Bogdanov, J. Applied Chem. (U. S. S. R.) 15, 249–59 (1942), abstracted in Chemical Abstracts, volume 37, page 2486 (1943).

It is generally the aim of the art in polymerizing monomers to seek to obtain the high molecular weight products which are form stable. This is attributable to the fact that such products have many uses or applications to which the liquid or sticky, viscous products cannot be put. For instance, the form stable products may be used as molding powders, compositions for pressure casting, extrusion compositions and the like. In certain cases they may also be used for insulation purposes, rubber substitutes and so on. The art therefore attaches particular significance to polymerization operations by means of which it is possible to produce the high molecular weight, form-stable polymers.

It appears to have been the impression of the prior workers in this field that vinyl n-butyl ether could only be effectively polymerized particularly to yield viscous liquid or soft solid products by causing the reaction to take place by means of acid-reacting catalysts at such a violent rate that the reaction is completed immediately after contact of the catalyst with the monomer. Consequently, the prior art utilized temperatures ranging upward from about −10° C. and preferably within the range of 40 to 60° C. For instance, in the Russian article referred to above, it is stated that the best method of polymerizing vinyl n-butyl ether is with ferric chloride at a temperature of 40 to 60° C. The same range of temperatures is referred to in paragraph 2, column 1, page 3 of USP 2,104,000. By working according to the methods of the prior art, however, the polymer obtained is in every case a viscous, sticky, honey-like mass. Thus, USP 2,104,000 which contains a comprehensive discussion of vinyl ether polymers characterizes the polyvinyl n-butyl ethers thereof as "a viscous liquid," "a colorless, honey-like, highly viscous and sticky product," and the like. These liquid or semisolid masses are not form stable, by which I mean that they do not retain their shape on standing, but, like liquids, assume the shape of the container in which they are stored. They are also entirely unlike rubber in that they show no evidence of reversible elasticity. Because of the properties evinced by such products, they cannot be used as rubber substitutes.

I have now found that it is possible to polymerize vinyl n-butyl ether into form-stable, rubberlike masses by so controlling the reaction that polymerization ensues at a mild rate rather than at a violent rate as prescribed by the prior art.

It is an object of the invention to produce form-stable, rubberlike polymers of vinyl n-butyl ether.

A further object of the invention are such polymers.

Another object of the invention is a process of producing form-stable, rubberlike polymers and copolymers of vinyl n-butyl ether by a controlled method which causes the polymerization to take place at a mild rate.

Another object of the invention is a process of producing form-stable, rubberlike polymers and copolymers of vinyl n-butyl ether by moderating the polymerization through a control of the reaction temperature and the rate of addition of the catalyst to the reaction mixture.

It is a further object of this invention to produce products which are superior from the standpoint of homogeneity by uniformly premixing the monomer and the catalyst at a temperature at which polymerization does not ensue and effecting polymerization by elevating the temperature of the reaction mixture.

It is a further object of this invention to insure a better heat control and rate of reaction by polymerizing a uniformly premixed composition of the monomer and catalyst.

Other and further advantages will be apparent as the description proceeds.

In order to effect polymerization of the vinyl n-butyl ether monomer, I employ acid-reacting condensing agents, such as tin tetrachloride, stannous chloride, aluminum chloride, iron chloride, zinc chloride, sulfuric acid, hydrochloric acid, sulfur dioxide and the like. However, best results ensue by the utilization of boron trifluoride or its addition products with ethers (see Gmelin's Handbuch Der Anorganischen Chemie, 8th edition, volume "Boron," pages 114 et seq.). Examples of ethers which I have found to be suitable are: diethyl ether, dipropyl ether, ethyl methyl ether, dibutyl ether, diamyl ether and the like. These catalysts are used in relatively small amounts, for instance, in the proportions referred to in USP 2,104,000.

The main feature of the process which I find must be controlled in order to obtain the form-stable, rubberlike polymers, is the reaction temperature. I have discovered that it is absolutely necessary in obtaining such products to moderate the reaction by maintaining the temperature uniformly throughout the reaction mixture at or below −45° C. and preferably not higher than −70° C., but not so low as −100° C., during the entire time of contact between the catalyst and the monomer. If the temperature be permitted to rise above −45° C., the products obtained are of the viscous, sticky type, such as are disclosed in the prior art, which have been produced up to the present time. In other words, the maintenance of a uniform temperature at or below −45° C. is critical to the formation of the form-stable, rubberlike products.

Various methods may be resorted to to attain and maintain the necessary reaction temperature. Solid carbon dioxide, for instance, may be used to effect this result. Similarly, the desired low temperature may be secured by the use of liquefied refrigerants, such as liquefied ethylene and the like.

The reaction is carried out by adding the catalyst, cooled to the desired reaction temperature, to the monomer or its solution, both similarly cooled, or by adding the monomer, cooled to the reaction temperature, to the catalyst mixture, which is likewise so cooled. While cooling the catalyst facilitates the reaction, the temperature thereof should not be lowered to the reaction temperature if the catalyst solidifies at such temperature. In that event, cooling will be effected to the lowest point where the catalyst still remains in the liquid state. It can be readily ascertained, either from the critical tables or by simple experiments, to what extent the catalyst may be cooled without solidification thereof taking place.

While good results are obtained by operating as stated, I have found that the reaction is expedited from the standpoint of heat control and speed of the reaction and that products of a superior homogeneity are obtained if the catalyst and monomer be uniformly mixed at a temperature at which polymerization does not ensue and polymerization effected after mixing by subjecting the mixture to a higher temperature and within the limits stated above. It is known that catalytic reactions are best effected where steps are taken to insure the greatest possible amount of contact between the catalyst and the substances which are being subjected to the reaction. By uniformly premixing the catalyst and the monomer, such contact is produced.

The art has always been under the impression that vinyl compounds which polymerize at low temperatures, i. e., below 0° C., including the vinyl ethers, undergo polymerization at a rapid rate in the presence of an acid catalyst irrespective of the temperature applied. For instance, it has been reported that when polymerizing isobutylene the rate of reaction is not decreased by lowering the temperature. Contrary to expectations, I have now found that the rate of reaction for each vinyl ether varies with the temperature and for each there is a temperature below which the rate of reaction is substantially zero when using an acid reacting catalyst with an inert diluent such as the liquefied hydrocarbons and the like subsequently mentioned. For the vinyl n-butyl ether monomers, such temperature is below −100° C. and it can be obtained by utilizing liquid ethylene as the cooling medium. The significance of this discovery is material and is reflected by the particular advantages which accrue from its adoption, especially as regards polymer homogeneity, heat control and reaction rate.

In order to effectively maintain a uniform reaction temperature, the reaction heat should be dissipated. This effect may be realized by the use of solvents or diluents which are liquid at the reaction temperature. Liquefied hydrocarbons, such as liquefied ethane, liquefied propane, liquefied butane, liquefied ethylene, and chlorinated hydrocarbons such as methylene chloride and the like, are materials which meet this requirement.

Depending upon the particular temperature selected for the polymerization, the rate of catalyst addition may have a decided bearing on the course of the reaction. If a temperature near the lower end of the stated range is employed, i. e., of about −75 to about −80° C., all of the catalyst may be added in a short period of time—say, in a period of about two minutes—while still permitting the moderate reaction necessary for the production of the form-stable, rubberlike polymers. However, should the temperature of operation be near the upper end of the stated range, as, for instance, within the limits of about −45 to about −70° C., it is essential that the catalyst be added dropwise to avoid localized overheating and the danger of losing control of the reaction. While it is possible, as stated, to add the catalyst fairly rapidly when using sufficiently low temperatures within the stated range, nevertheless the possibility of the reaction getting out of hand with the attendant formation of the viscous, sticky products is always so real as to recommend the adoption in every case as a safety measure, of the step of slowly adding the catalyst to the polymer. Although the adoption of this measure may slow down the process to a certain extent, this is more than compensated for by the assurance that the reaction will remain in the control of the operator.

When the reaction is completed, the catalyst is inactivated, a procedure which will hereinafter be referred to as "quenching," by a treatment which is preferably carried out at very low temperatures, specifically below about −45° C. For effecting such quenching there may be employed an alkali, such as ammonium hydroxide, sodium hydroxide, potassium hydroxide, an organic amine, such as methyl amine, diethyl amine, ethanolamine, diethanolamine, pyridine and the like, alcohol such as methanol, ethanol, butanol, benzyl alcohol and the like, carbonyl compounds such as acetone, methyl ethyl ketone, formaldehyde, acetaldehyde and the like. In the event that any of these quenching agents freeze at the quenching temperature, solidification of such agents may be avoided by employing with the quenching agent a small amount of an inert diluent, such as pentane. The inactivated catalyst may be removed by washing the polymer solution, if desired, under pressure and at room temperature, with water rendered alkaline by the addition of ammonium hydroxide or the like or by dissolving the dry polymer in a solvent therefor such as benzene and precipitating it from solution with the aid of a material in which the polymer is insoluble while the catalyst remains soluble, such as ethanol, methanol and the like. By causing the quenching to take place at very low temperatures, it is insured that there will be no conversion of any residual monomer at a temperature at which the undesirable low molecular weight products are formed.

While it is possible to produce the solid, rubberlike polymers by carrying out the reaction in a reactor open to the air, better results are obtained when air is essentially excluded. The polymerization, moreover, may take place conveniently at atmospheric pressure, reduced pressure of the order of 200 mm. or the like, or elevated pressures such as 34.5 pounds per square inch gauge pressure.

The vinyl n-butyl ether is also capable of copolymerizing with other vinyl monomers, such as other vinyl ethers, under the stated conditions. Thus, vinyl isobutyl ether, or the like, may be copolymerized with vinyl n-butyl ether to form a material similar to the rubberlike polyvinyl n-butyl ether. Similarly, a rubberlike product is obtained by copolymerizing vinyl n-butyl ether with other polymerizable monomers, such as isobutylene.

The vinyl n-butyl ether from which my polymers are derived may be obtained by the reaction of n-butyl alcohol with acetylene. The monomer need not be subjected to an elaborate purification to condition it for polymerization. Alcohols must be removed, since they have the property of destroying acid-reacting catalysts. Satisfactory purification can be accomplished by subjecting the monomer to one precise fractional distillation over a mixture of potassium hydroxide and sodium metal. Vinyl n-butyl ether has the following physical properties: B. P. 92.8–93° C./760 mm., $n_D^{25}=1.3992$, $n_D^{20}=1.4024$, $$d_{20}^{20}=0.7796$$

The polyvinyl n-butyl ethers and their copolymers obtained by my method are spongy, elastic and tenacious solids in contrast to the polyvinyl n-butyl ethers obtained according to the prior art. They show substantially reversible extensibility similar to partially vulcanized rubber. Although the polymers are not sticky to the touch, they exhibit tack when brought into contact by pressure with other surfaces. They are thermoplastic materials soluble in benzene, toluene, ethers, ketones, chlorinated hydrocarbons and the like. They are, however, insoluble in water and the lower alcohols although soluble in the higher alcohols, such as butanol and the like.

The polymers may be worked on a mill for compounding purposes or cast from solutions for laminating and coating purposes and for the production of transparent sheets. They are amenable to extrusion and molding. They can be used as pressure adhesives, electric insulators and for imparting strength and flexibility to waxes, paraffins and brittle plastic materials.

The contrast between our polymers and those of the prior art can be clearly brought home by a consideration of the viscosities exhibited by the two. It is reported that the polymers of the prior art remain soluble in their reaction solvents, such as sulfur dioxide (see USP 2,098,108 and 2,188,778) or in organic diluents (see USP 2,104,000 and the Russian citation referred to above). My products, on the other hand, are substantially insoluble in their reaction diluents, such as in liquid propane. Actual measured viscosities show that the liquid low molecular polymers have intrinsic viscosities less than about 0.5, the soft solids are intermediate, while the rubberlike high polymers have intrinsic viscosities of above 5 (.1 per cent in benzene).

The invention will be further illustrated by the following examples, although it is to be understood that my invention is not limited thereto.

*Example 1*

To 1100 grams of powdered solid carbon dioxide contained in an air-tight apparatus are added 750 grams of liquefied propane and 250 grams of precooled vinyl n-butyl ether. A cooling bath of ethanol and solid carbon dioxide is used to assist in maintaining the operating temperature, in this case −78° C. This mixture is stirred for about one-half hour to vent out all air, which is replaced by an atmosphere of carbon dioxide. Diethyl ether-boron fluoride, B. P. 56° C./25 mm., is added dropwise at such a rate that the temperature is maintained essentially at −78° C. Insoluble polymer begins to precipitate and the catalyst is added until no monomer remains. This point may be determined by removing a sample of liquid, allowing it to warm up to evaporate the propane from the monomer, and adding to this some catalyst. If no polymerization is observed by heat evolution and charring, the test is conclusive of the fact that all the monomer has been polymerized.

Concentrated aqueous ammonia, cooled to below −50° C. is added as a quenching agent. On warming to room temperature and drying, a spongy, rubberlike, form-stable polymer is obtained. It exhibits elasticity, reversible extensibility and high tensile strength. After storage at room temperature for as long as nine months, the product retained its granular form and its form stability. The intrinsic viscosity of this material is 11.0 (0.1% in benzene).

*Example 2*

The polymer is formed in the same manner and under the same conditions as in Example 1. However, the precipitated polymer is removed as formed by periodic interruption of the catalyst addition and by dipping out the solid material. The cold polymer is quenched with precooled ammonium hydroxide before warming and drying.

*Example 3*

The process is the same as in Example 1 except that the catalyst is precooled before its addition by causing it to flow through a chamber cooled by an alcohol-solid carbon dioxide mixture.

*Example 4*

Into an open flask are placed 25 grams of powdered solid carbon dioxide, 40 grams of liquefied propane and 10 grams of vinyl n-butyl ether. While stirring, a stream of gaseous boron trifluoride is passed into the mixture. A solid, rubberlike polymer is formed at the reaction temperature which is essentially −71° C.

The contents of the flask are quenched with concentrated aqueous ammonia while maintaining said low temperature. The reaction mixture is then warmed to room temperature, at which the product is washed with methanol and dried.

*Example 5*

Into a flask are placed 200 grams of liquid butane and 50 grams of vinyl n-butyl ether. The mixture is cooled to −78° C. by means of solid carbon dioxide and an external cooling bath. Precooled diethyl ether-boron fluoride is added portionwise at such a rate that the temperature is maintained between −77 and −78° C. At the completion of the reaction, quenching is effected with concentrated aqueous ammonia and the reaction mixture warmed to room temperature. On drying, a pressure-tacky, form-stable product rubbery in nature is obtained.

*Example 6*

To 325 grams of powdered solid carbon dioxide are added 200 grams of vinyl n-butyl ether. A precooled 25 per cent solution (by volume) of diethyl ether-boron fluoride in diethyl ether is added dropwise with stirring. The reaction temperature is —76° to —77° C. After quenching with ammonia at this temperature and warming to room temperature, the mixture is dissolved in benzene and precipitated with methanol to produce a catalyst-free product. On washing with fresh methanol and drying, a form-stable, solid, rubberlike polymer is obtained.

*Example 7*

To a mixture of 600 grams of liquefied propane and 4 ml. of diethyl ether-boron fluoride maintained at —78° C. with the aid of solid carbon dioxide and an external cooling bath are added dropwise with stirring, 200 grams of vinyl n-butyl ether precooled to —76° C. Then 20 ml. of precooled 28 per cent ammonium hydroxide are added and the contents warmed to room temperature where the polymer, free of propane and carbon dioxide, is dissolved in 1000 grams of benzene. This solution is added to 2000 grams of rapidly stirred methanol. The precipitated polymer is separated, washed with 1000 grams of fresh methanol and dried to yield a catalyst-free, rubberlike product.

*Example 8*

Into 600 grams of liquefied propane cooled by an external cooling bath of solid carbon dioxide to —75° C. are passed 800 ml. of gaseous boron trifluoride. 75 grams of vinyl n-butyl ether precooled to —75° C. are then added in portions. A spongy, elastic material is formed which is recovered by warming the reaction mixture to room temperature after deactivation of the catalyst.

*Example 9*

The polymerization vessel is charged with 50 pounds of vinyl n-butyl ether and 200 pounds of liquefied propane. Solid carbon dioxide is added to the mixture throughout the reaction to maintain a temperature of —78° C. to —74° C. Diethyl ether-boron fluoride is added slowly to cause the polymerization to ensue.

At the completion of the catalyst addition, the mixture is warmed to —65° C. to remove most of the carbon dioxide. Then a sodium hydroxide solution is added to inactivate the catalyst. Now the vessel is closed and heated to above +5° C. The pressure rises to above 140 pounds per square inch. With stirring, 125 pounds of water are sprayed onto this warmed liquid propane solution of polymer. The stirring is stopped and the water layer is separated. This water washing operation is repeated until all acidic material is removed. The washed polymer solution is freed of its propane by venting or by cooling and then filtering the liquid propane from the insoluble polymer. The solvent may be reused in subsequent polymerizations.

The product is dried at 40° to 50° C. at a vacuum of 20 inches for twelve hours to remove all moisture. A rubberlike, resilient, tenacious, high molecular weight polymer is obtained.

*Example 10*

A solution of 50 grams of vinyl n-butyl ether and 50 grams of methylene chloride is cooled to —78° C. with the aid of solid carbon dioxide and an external cooling bath. Then at this temperature diethyl ether-boron fluoride is added dropwise with stirring to effect the polymerization. The catalyst is inactivated with concentrated aqueous ammonia used as a quenching agent. After warming to room temperature, methanol is added to precipitate the polymer from solution, and a tough, rubberlike product is obtained on drying.

*Example 11*

A solution of 100 grams of vinyl n-butyl ether and 100 grams of vinyl isobutyl ether in 800 grams of liquid propane is cooled to —78° C. by means of solid carbon dioxide and an external cooling bath. Dibutyl ether-boron fluoride B. P. 61.9° C. at 10 mm. is added dropwise to the solution. The polymer formed is treated at the reaction temperature with concentrated aqueous ammonia as a quenching agent. On drying, a rubbery polymer is obtained.

*Example 12*

The polymerization is effected as in Example 1 except that instead of employing solid carbon dioxide as the cooling agent, the heat of vaporization of the solvent is utilized for this purpose. By applying a vacuum of 200 mm. to the reaction mixture, the temperature is maintained at —78° C. The propane which is removed is condensed and recycled.

*Example 13*

Gaseous boron trifluoride is passed into an agitated mixture of 40 grams of liquid ethylene and 10 grams of vinyl n-butyl ether, cooled to —80° C. and confined in a pressure vessel maintained at 34.5 pounds per square inch gauge pressure. The reaction temperature does not exceed —70° C. After completion of the polymerization, concentrated ammonium hydroxide is forced into the reaction mixture under pressure. The ethylene is then allowed to escape whereupon the pressure falls to atmospheric. A form-stable, rubberlike product is thus obtained.

*Example 14*

To a solution of 50 grams of vinyl n-butyl ether and 200 grams of liquefied propane, maintained at —101° C. with the aid of a liquid ethylene bath, is added slowly with vigorous stirring 2.5 ml. of diethyl ether-boron fluoride. With continued agitation, the temperature of the reactants is raised to —75° C. where polymerization takes place as evidenced by precipitation of polymer. An alcohol-solid carbon dioxide bath surrounding the reactor is suitable for controlling the temperature at —75° C.

The contents of the flask are quenched with concentrated aqueous ammonia while maintaining said low temperature. The reaction mixture is then warmed to room temperature at which the product is washed with methanol and dried. There is thus obtained a form-stable, very homogeneous, rubberlike polymer.

*Example 15*

The process is the same as in Example 1 except that there is employed the aluminum chloride-diethyl ether complex in lieu of the boron fluoride-diethyl ether complex of Example 1.

It has been emphasized above that my invention is concerned with the preparation of polyvinyl n-butyl ethers which are solid and rubberlike in character. It is true that solid, rubberlike polyvinyl isobutyl ether has been made according to USP 2,061,934. The preparation of the solid in the patent, however, is predicated upon the utilization of an extremely pure vinyl isobutyl ether. For instance, in Example 1 it is required that the product obtained by the reaction of acetylene with isobutyl alcohol be fractionally distilled three times over powdered potassium hydroxide. The main fraction thus obtained is then subjected twice to a refining fractional distillation. No such purification, however, is required in producing the solid, rubberlike polymers from the n-butyl ether so long as the distillation employed ensures the removal of alcohol.

Moreover, according to the patent, the reaction by which the polymer is obtained takes place spontaneously upon the addition of the catalyst as in the other prior art processes previously referred to. It appears that despite this fact a solid is obtained. Furthermore, the patentee stresses the fact that his solid product can be obtained by operating at temperatures as high as $-10°$ C. These facts all serve to establish a very marked distinction between the properties of the vinyl isobutyl ether on the one hand and the normal butyl ether on the other hand. Thus, unless one takes the precautions recited herein, it is a physical impossibility to polymerize vinyl n-butyl ether to form-stable products. I have conducted experiments wherein I cooled the normal butyl ether monomer and the catalyst, such as boron trifluoride, to temperatures as low as $-15°$ C. by means of solid carbon dioxide, while permitting the reaction to take place spontaneously, but was only able to obtain sticky, viscous masses of the type described in the prior art.

Various modifications of the invention will suggest themselves to persons skilled in the art. For example, as a substitute for solid carbon dioxide, as the refrigerant, a jacket or coil may be attached to the polymerization apparatus through which a cold liquid may be pumped for purposes of maintaining the reaction temperature and for efficiently removing the heat of polymerization. Liquid ethylene may be used as such a cold liquid. I therefore do not intend to be limited in the patent granted except as required by the prior art and the appended claims.

I claim:

1. The process of producing form-stable, rubberlike polymers of vinyl n-butyl ether which comprises uniformly admixing vinyl n-butyl ether and an acid-reacting condensing agent selected from the class consisting of boron trifluoride and its addition product with an ether at a temperature below $-100°$ C., subsequently elevating the temperature of the mixture to a point ranging from $-45°$ C. to $-80°$ C. and maintaining such temperature uniformly throughout the reaction.

2. The process as defined in claim 1 wherein the temperature is elevated to a point not higher than $-70°$ C.

3. The process of producing a form-stable rubberlike polyvinyl n-butyl ether which comprises subjecting vinyl n-butyl ether to polymerization in the presence of a diluent which is liquid at the reaction temperature by means of an acid reacting condensing agent selected from the class consisting of boron fluoride and its addition product with an ether while controlling the polymerization so that it does not proceed at a violent rate by maintaining a temperature ranging from $-45°$ to $-80°$ C. uniformly throughout the reaction mixture and while adding one reactant slowly and portionwise to the other and subjecting the acid reacting condensing agent after the complete conversion of the vinyl n-butyl ether to deactivation at the reaction temperature.

4. The process as defined in claim 3 wherein the polymerization takes place with another polymerizable compound selected from the class consisting of other vinyl ethers and isobutylene.

5. The process as defined in claim 3 wherein the deactivation is effected by means of an alkali.

6. The process as defined in claim 3 wherein the diluent is liquefied propane and the deactivating agent is ammonium hydroxide.

ABRAHAM O. ZOSS.

REFERENCES CITED

The following references are of record in the file of this patent:

UNITED STATES PATENTS

| Number | Name | Date |
|---|---|---|
| 2,061,934 | Mueller-Conradi et al. | Nov. 24, 1936 |
| 2,098,108 | Reppe et al. | Nov. 2, 1937 |
| 2,104,000 | Reppe et al. | Dec. 28, 1937 |
| 2,108,994 | Reppe et al. | Feb. 22, 1938 |
| 2,379,656 | Ruthruff | July 3, 1945 |
| 2,395,684 | Schildknecht | Feb. 26, 1946 |

FOREIGN PATENTS

| Number | Country | Date |
|---|---|---|
| 501,670 | Great Britain | Mar. 3, 1939 |